US006986452B2

(12) United States Patent
Dracup et al.

(10) Patent No.: US 6,986,452 B2
(45) Date of Patent: Jan. 17, 2006

(54) FRICTION STIR WELDING AS A RIVET REPLACEMENT TECHNOLOGY

(75) Inventors: Brian J. Dracup, San Francisco, CA (US); William J. Arbegast, Rapid City, SD (US)

(73) Assignee: Lockheed Martin Corporation, New Orleans, LA (US)

( * ) Notice: Subject to any disclaimer, the term of this patent is extended or adjusted under 35 U.S.C. 154(b) by 154 days.

(21) Appl. No.: 10/438,799

(22) Filed: May 15, 2003

(65) Prior Publication Data

US 2004/0050907 A1    Mar. 18, 2004

Related U.S. Application Data

(63) Continuation-in-part of application No. 10/217,179, filed on Aug. 12, 2002, now Pat. No. 6,779,707, which is a continuation of application No. 09/571,789, filed on May 16, 2000, now abandoned.

(60) Provisional application No. 60/152,770, filed on Sep. 3, 1999.

(51) Int. Cl.
    *B23K 20/12* (2006.01)

(52) U.S. Cl. ..................... 228/112.1; 228/2.1
(58) Field of Classification Search ............. 228/112.1, 228/2.1
    See application file for complete search history.

(56) References Cited

U.S. PATENT DOCUMENTS

| 6,051,325 | A  | * | 4/2000  | Talwar et al. ............... 428/593 |
| 6,739,495 | B2 | * | 5/2004  | Okamura et al. ......... 228/112.1 |
| 2001/0052561 | A1 | * | 12/2001 | Wollaston et al. .......... 244/132 |
| 2003/0192941 | A1 | * | 10/2003 | Ishida et al. ............. 228/112.1 |
| 2004/0050907 | A1 | * | 3/2004  | Dracup et al. ........... 228/112.1 |
| 2004/0065716 | A1 | * | 4/2004  | Young et al. ............ 228/112.1 |

FOREIGN PATENT DOCUMENTS

| JP | 10286682     | * | 10/1998 |
| JP | 411010368 A  | * | 1/1999  |
| JP | 411047959 A  | * | 2/1999  |
| JP | 02000094159 A| * | 4/2000  |
| JP | 02000317652 A| * | 11/2000 |
| JP | 2002283069 A | * | 1/2005  |

* cited by examiner

Primary Examiner—Kiley S. Stoner
(74) Attorney, Agent, or Firm—Garvey, Smith, Nehrbass & Doody, L.L.C.; Charles C. Garvey, Jr.

(57) ABSTRACT

The present invention provides an improved method and apparatus for joining aluminum allow panels (eg. 2090-T83 aluminum lithium alloy). The method preliminarily positions two panels and skin panels next to each other so that a stringer panel overlaps a skin panel. A friction stir weld pin tool penetrates through one panel and at least partially into another panel. The panel material around the pin tool is frictionally heated, plasticized and joined until the faying surface is substantially consumed. In another embodiment, a tee-shaped structure is formed using friction stir welding to join three panels together. A projecting part of one panel (center, vertical) provides material that becomes a contoured corner panel below two side, horizontal panels after friction stir welding is completed (FIGS. 29, 30)

6 Claims, 12 Drawing Sheets

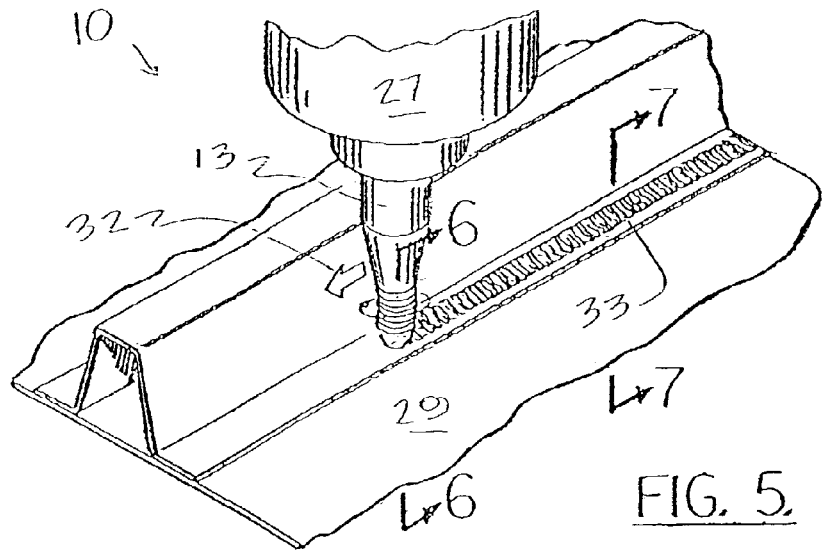
FIG. 5.
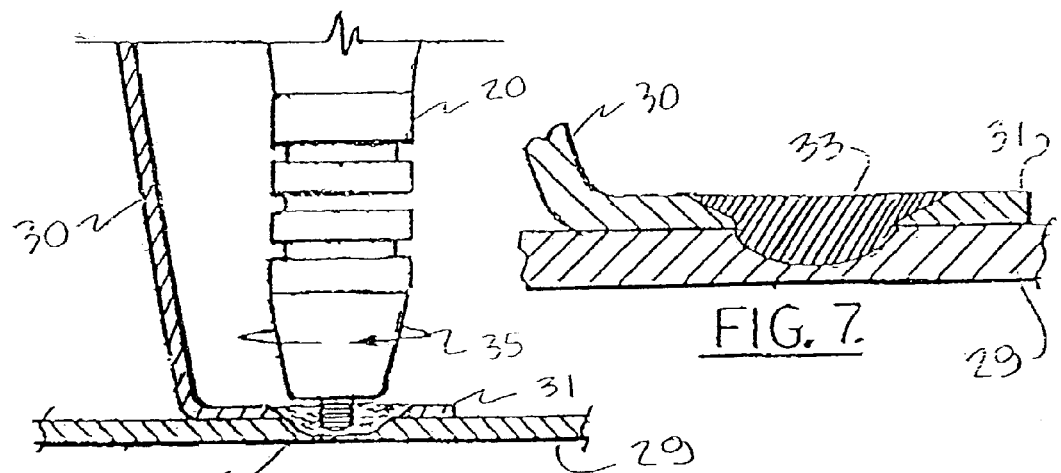
FIG. 6.
FIG. 7.
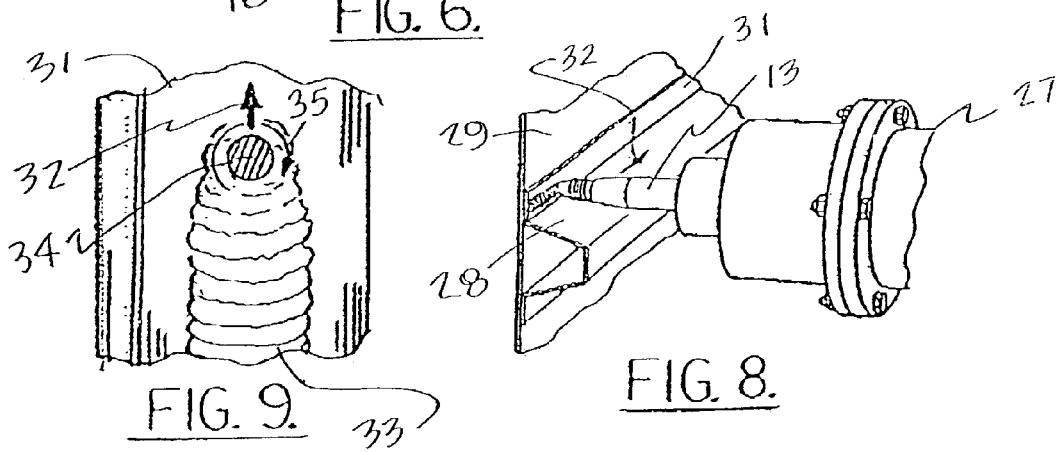
FIG. 9.
FIG. 8.

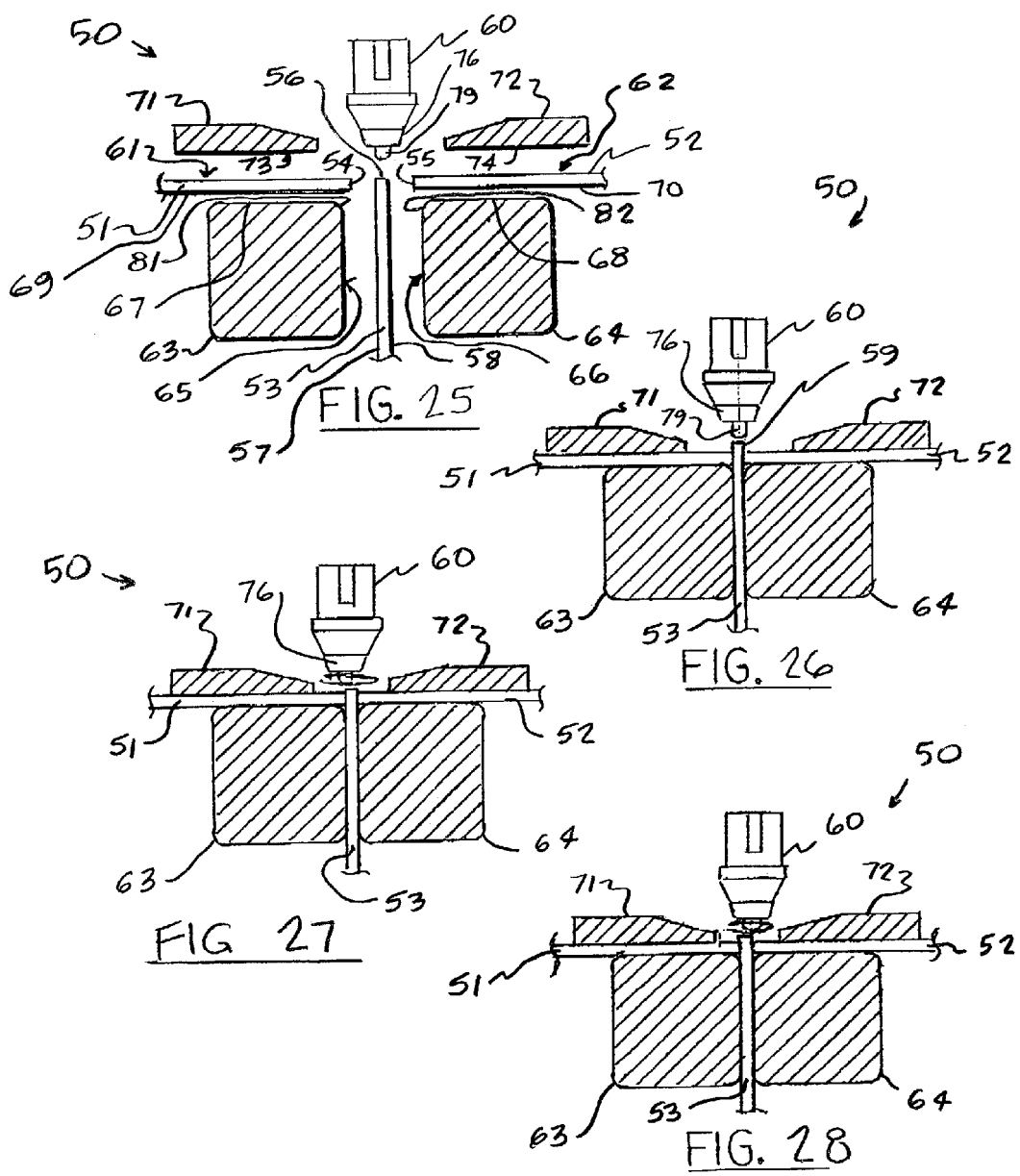

FRICTION STIR WELDING AS A RIVET REPLACEMENT TECHNOLOGY

CROSS-REFERENCE TO RELATED APPLICATIONS

This is a continuation-in-part of U.S. patent application Ser. No. 10/217,179, filed Aug. 12, 2002 now U.S. Pat. No. 6,779,707, Which is a continuation of Ser. No. 09/571,789, filed May 16, 2000, now abandoned each of which is hereby incorporated herein by reference.

Priority of U.S. Provisional Patent Application Ser. No. 60/152,770, filed Sep. 3, 1999, incorporated herein by reference, is hereby claimed.

STATEMENT REGARDING FEDERALLY SPONSORED RESEARCH OR DEVELOPMENT

The inventions described herein were made in the performance of work under Lockheed Martin Michoud Space Systems IRAD (Internal Research and Development).

REFERENCE TO A "MICROFICHE APPENDIX"

Not applicable

BACKGROUND OF THE INVENTION

1. Field of the Invention

The present invention relates to the manufacture of aircraft, space vehicles and the like wherein panels are connected using friction stir welding. More particularly, the present invention relates to the construction of aircraft, space vehicles and the like wherein an improved method enables stringer stiffened panels to be joined with friction stir lap welds, in replacement of the traditional riveting practice.

2. General Background of the Invention

Friction stir welding (FSW) is a solid state joining process developed by The Welding Institute (TWI), Cambridge, England and described in U.S. Pat. No. 5,460,317, incorporated herein by reference. Compared with traditional fusion welding processes, it offers simplified processing, improved mechanical properties, diminished weld defect formation, equivalent corrosion resistance, and reduced distortion, shrinkage, and residual stresses. Using conventional milling equipment with a backside anvil support, a non-consumable, cylindrical pin tool is rotated and plunged into the butt or lap joint of the material to be welded. Pin tools are specifically designed for a given alloy and gauge. Also incorporated herein by reference are U.S. Pat. No. 5,718,366 and all references disclosed therein. The following additional references of possible interest are incorporated herein by reference: U.S. Pat. Nos. 3,853,258, 3,495,321, 3,234,643, 4,087,038, 3,973,715, 3,848,389; British Patent Specification No. 575,556; SU Patent No. 660,801; and German Patent No. 447,084. Publications that discuss friction stir welding include "New Process to Cut Underwater Repair Costs", TWI Connect, No. 29, January 1992; "Innovator's Notebook", Eureka Transfer Technology, October 1991, p. 13; "Repairing Welds With Friction-Bonded Plugs", NASA Tech. Briefs, September 1996, p. 95; "Repairing Welds With Friction-Bonded Plugs", Technical Support Package, NASA Tech. Briefs, MFS-30102; "2195 Aluminum-Copper-Lithium Friction Plug Welding Development", AeroMat '97 Abstract; "Welding, Brazing and Soldering", Friction welding section: "Joint Design", "Conical Joints", Metals Handbook: Ninth Edition, Vol. 6, p. 726. A publication authored by applicants is entitled "Friction Stir Welding as a Rivet Replacement Technology"; Brian Dracup and William Arbegast; SAE Aerofast Conference, Oct. 5, 1999.

BRIEF SUMMARY OF THE INVENTION

The present invention provides an improved method of constructing structures such as aircraft using friction stir welding, to thereby replace the traditional riveting practice of previously unweldable aluminum alloys. Possible applications include the intertank of the External Tank of the Space Shuttle and airplane manufacturing.

Friction Stir Welding is a Solid State joining process that now allows the welding of previously unweldable aluminum alloys. Traditionally, these aluminum alloys have found use only in mechanically joined structures such as in aircraft and space vehicles. The present invention provides a method of joining overlapped panels using friction stir welding, replacing the traditional riveting practice. The method of the present invention is a viable, and cost reducing alternative to aluminum riveted structures.

The present invention features a non-consumable friction stir weld pin tool (see FIGS. 1–4) that is preferably constructed of H13 tool steel. The tool is rotated, plunged, and traversed along the stringer flanges of a stringer-skin panel to produce a friction stir lap weld. The tool is preferably tilted at an angle of about 2½ degrees.

As the pin tool initially plunges into the weld jointline, the material is frictionally heated and plasticized at a temperature below that of the alloy's melting temperature and typically within the material's forging temperature range. When the metal becomes sufficiently soft and plastic, and the appropriate penetration depth has been reached, the tool is traversed along the weld line. As the tool is traversing, metal flows to the back of the pin tool where it is extruded/forged behind the tool. It then consolidates and cools under hydrostatic pressure conditions [2–8].

Unlike fusion welding processes in which there are numerous inputs to the welding schedule, friction stir welding requires only three: spindle speed (RPM), travel speed (IPM), and the penetration depth of the tool in the material (heel plunge or penetration ligament). Penetration depth can be monitored either through load control or displacement [9].

The present invention thus discloses a method and apparatus that uses a friction stir welding tool that fully penetrates through the top sheet and partially penetrates into the bottom sheet. The material around the pin tool is frictionally heated, plasticized, and extruded/forged to the back of the pin where it consolidates and cools under hydrostatic pressure conditions.

Friction stir lap welding stringer-skin panels will eliminate the inter-rivet buckling commonly seen on mechanically joined structures and consequently, increase the buckling strength of the vehicle. In addition, the present invention enables simpler processing as compared with the traditional riveting practice by replacing any touch labor required with an automated process. Eliminating the rivets and other associated parts will also reduce quality control and material handling issues. Consequently, friction stir welding will increase production build rates and reduce production costs. Overall vehicle weight will also be decreased by eliminating the rivets and their associated parts.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 5 is a perspective view of the preferred embodiment of the apparatus of the present invention;

FIG. 6 is a sectional view taken along lines 6—6 of FIG. 5;

FIG. 7 is a sectional view taken along lines 7—7 of FIG. 5;

FIG. 8 is a perspective view of the preferred embodiment of the apparatus of the present invention;

FIG. 9 is a schematic top view illustrating the method of the present invention;

FIG. 25 is a schematic elevation, exploded view of an additional embodiment of the apparatus of the present invention;

FIG. 26 is a sectional, elevation view of the additional embodiment of the apparatus of the present invention;

FIGS. 27 and 28 are a schematic sectional, elevation views showing the additional embodiment of the apparatus of the present invention and illustrating the method of the present invention showing movement of the pin tool from one side of the weld site to the other;

DETAILED DESCRIPTION OF THE INVENTION

Figure 1:
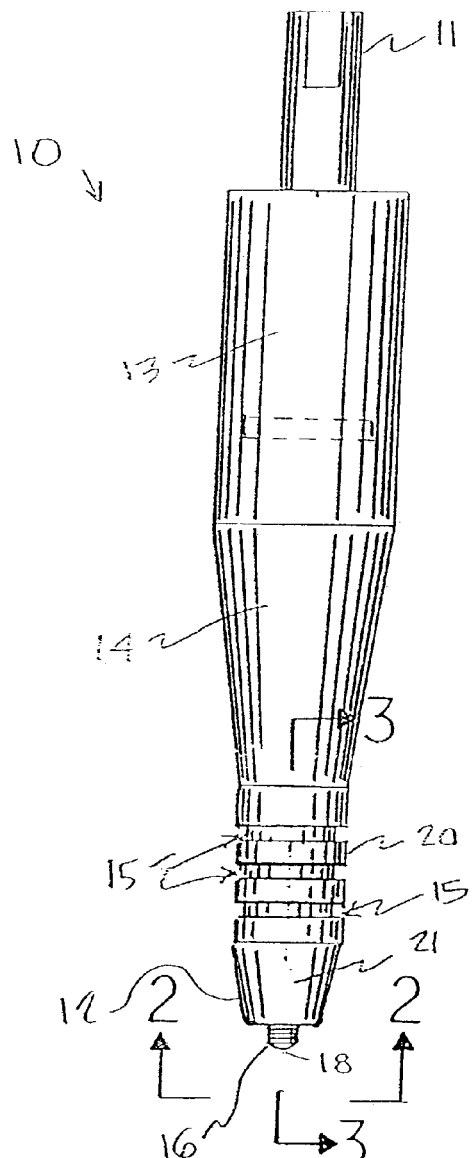
FIG. 1 is a side view of the pin tool portion of the preferred embodiment of the apparatus of the present invention that is used in the method of the present invention.
Figure 2:
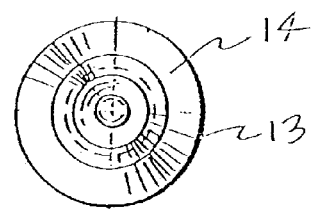
FIG. 2 is an end view of the pin tool of FIG. 1, taken along lines 2—2 of FIG. 1.
Figure 3:
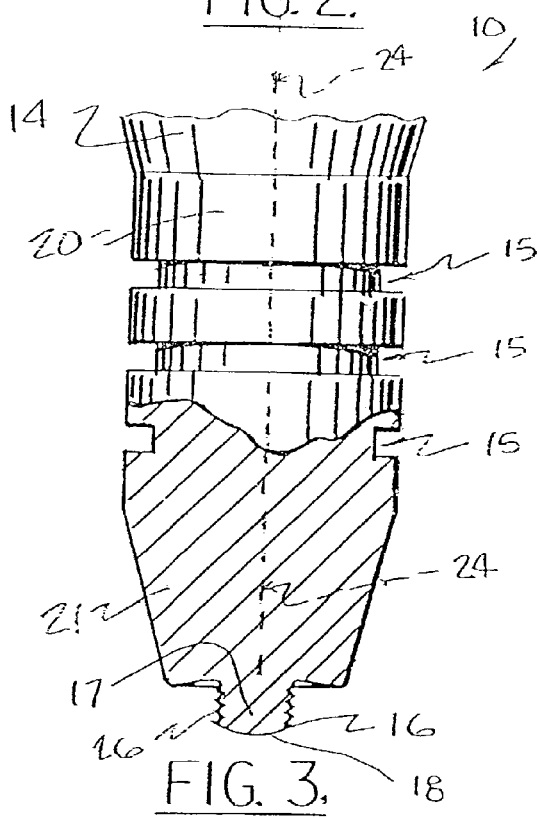
FIG. 3 is a side, partial section view of the pin tool of FIG. 1, taken along lines 3—3 of FIG. 1.

In FIGS. 1–4, the pin tool that is used as part of the method of the present invention is shown in detail, and designated generally by the numeral 10 in FIG. 1. Pin tool 10 provides a first end portion 11, a second end portion 12, and a middle section. The middle section includes frusto-conical shaped section 14 and cylindrical larger diameter section 13. Tool 10 has a central longitudinal axis 24. End portion 12 provides a smaller diameter cylindrical section 20 and a frustoconical section 21. The lower smaller diameter cylindrical portion 20 can include a plurality of angular grooves 15 as shown in FIG. 3. During use, the pin tool 10 is rotated, plunged, and traversed along the stringer flanges of a stringer-skin panel to produce a friction stir lap weld. The tool 10 is preferably tilted at an angle of about 2½ degrees. The tool 10 fully penetrates through the stringer and partially penetrates into the skin. The material around the pin tool 10 is frictionally heated, plasticized, and extruded/forged to the back of the pin where it consolidates and cools under hydrostatic pressure conditions.

Figure 4:
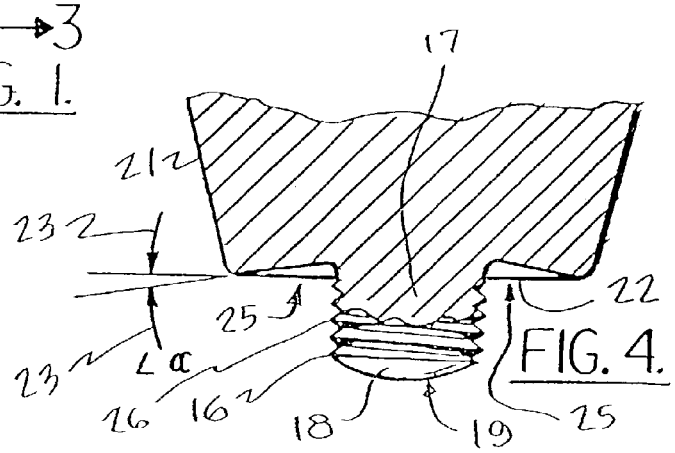
FIG. 4 is a fragmentary, enlarged section view of the pin tool of FIG. 1.

End portion 12 provides a tip 16 that actually penetrates the portions of the materials that are to be stir welded together. The tip 16 can be a generally cylindrical shaped portion 17 and dished end 18 having convex surface 19 (see FIG. 4). An annular shoulder 22 can surround tip 16 extending radially between the cylindrical section 17 and frusto-conical section 21 as shown in FIGS. 3 and 4. The annular shoulder 22 can form an angle 23 of about 8 degrees with a line that is perpendicular to the central longitudinal axis 24 of the pin tool 10. Thus, the annular shoulder 22 defines an annular cavity 25.

The generally cylindrically shaped portion 17 can have an external thread 26 as shown in FIGS. 1, 3 and 4. This external thread 26 helps produce a uniform stir weld. The concavity 25 enables some material to flow from the parts being welded into cavity 25 rather than laterally away from the weld site.

The threads 26 act to push the material down against the backside anvil. The cavity acts as a temporary reservoir that holds plastic metal that has been displaced by the volume of the pin (16).

FIGS. 5–9 show the method and apparatus of the present invention during the lap welding of two stringer panels 28, 29. It should be understood that the method and apparatus of the present invention can be used with any type of lap weld wherein there is full penetration through a top sheet and partial penetration through a bottom sheet. That top sheet can be of any geometry, including flat. In the example drawing of FIGS. 5 and 6, the top sheet has a "hat stringer" shape. The bottom sheet can be of any geometry, including flat. In the drawings shown such as in FIGS. 5, 6, 7 and 8, the bottom sheet is a flat sheet and can be called a "skin". In the embodiment shown in FIGS. 5–9, the method and apparatus of the present invention illustrates a "hat stringer"

being joined to a "skin". The resulting panel can be referred to as a "stringer-stiffened panel". In airplane manufacturing for example, the method and apparatus of the present invention would almost solely deal with two flat panels as opposed to the hat stringer and skin illustrations of FIGS. 5–9. In FIG. 5, a welding machine or welding head 27 is shown gripping pin tool 10 at end portion 11. The opposing end portion 12 of pin tool 11 engages each of the stringer panels 28, 29 as shown in FIGS. 5 and 6. The stringer 29 can be generally flat. The stringer 28 can include one or more inclined portions 30 and flat flange portions 31 as shown in FIG. 6.

The stir welding machine 27 rotates the pin tool 10 as shown in FIG. 9, indicated generally by the arrow 35. The numeral 34 shows the position of the pin tool 10 in hard lines. In FIG. 6, curved arrow 35 shows rotational motion that is transmitted from the stir welding machine 27 to the pin tool 10. In addition to rotation that is imparted to the pin tool 10 from the stir welding machine 27, linear motion is also transferred from the stir welding machine 27 to the pin tool 10. In FIGS. 5, 8 and 9, this linear motion is indicated schematically by the numeral 32. In FIG. 7, a weld 30 is shown penetrating an upper stringer panel 28 and part of a lower stringer panel 29. In FIG. 7, the weld 33 penetrates the flange 31 portion of stringer panel 28 and a majority of the thickness of the skin panel 29.

As the pin tool initially plunges into the weld 33 jointline, the material is frictionally heated and plasticized at a temperature below that of the alloy's melting temperature and typically within the material's forging temperature range. When the metal becomes sufficiently soft and plastic, and the appropriate penetration depth has been reached, the tool is traversed along the weld line. As the tool is traversing, metal flows to the back of the pin tool where it is extruded/forged behind the tool. It then consolidates and cools under hydrostatic pressure conditions.

Unlike fusion welding processes in which there are numerous inputs to the welding schedule, friction stir welding requires only three: spindle speed (RPM), travel speed (e.g., inches per minute or IPM), and the penetration depth of the tool in the material (heel plunge or penetration ligament). Penetration depth can be monitored either through load control or displacement.

Figure 10:
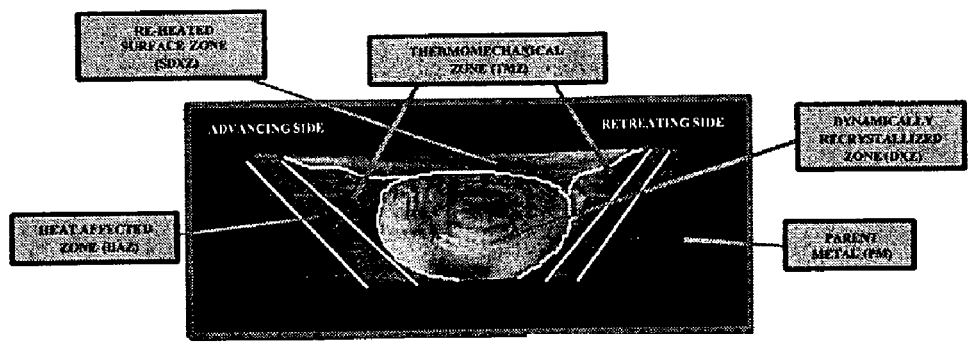
FIG. 10 is a schematic view showing typical microstructure of a full penetration friction stir weld in 0320" 2195-T8 alloy.

As shown in FIG. 10, several distinct metallurgical zones have been identified for both full penetration butt welds and partial penetration lap welds. Within the weld nugget, there exists a dynamically recrystallized microstructure consisting of fine, equiaxed grains on the order of 3–6 microns in size. Closer to the surface is a re-heated dynamically recrystallized zone (flow arm) where the trailing edge of the pin tool's shoulder drags parent material from the retreating side toward the advancing side after the pin tip has passed through. Further away from the weld jointline, there is insufficient heating and strain energy to cause complete recrystallization of the grains. This thermal-mechanical zone (TMZ) shows some degree of plastic deformation and grain boundary coarsening. The heat affected zone (HAZ) separates the TMZ from the parent metal.

Figure 11:
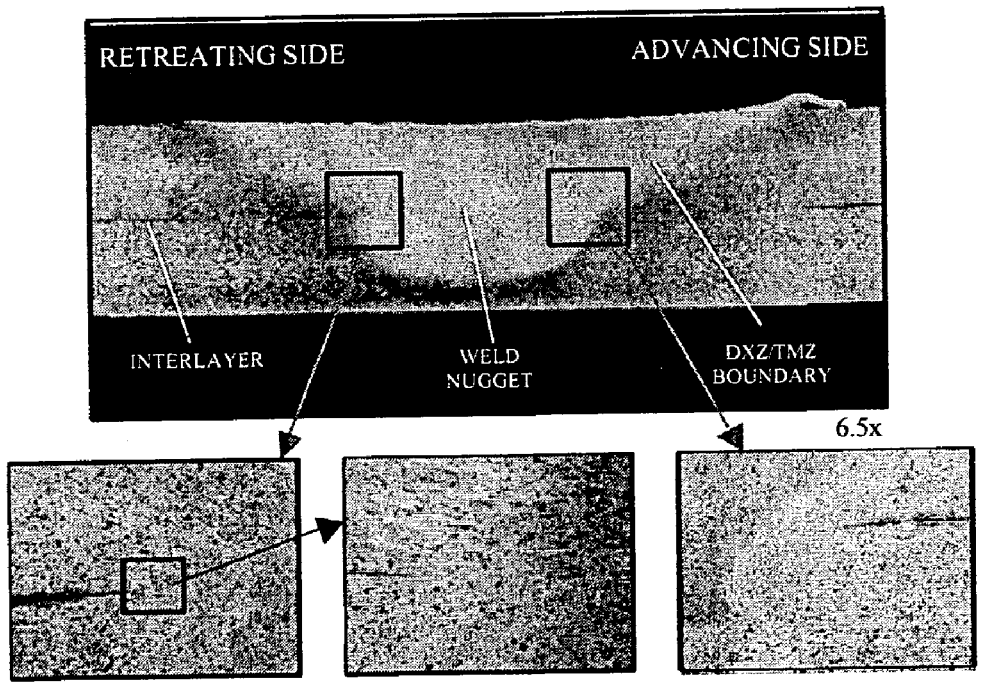
FIG. 11 is an illustration of typical microstructure of a partial penetration friction stir lap weld with no faying surface intermixing in 0.160" 2024-T83 alloy.

The basic metallurgy in friction stir lap welds is similar to full penetration butt welds. A dynamically recrystallized zone, a thermal mechanical zone, a re-heated surface zone (flow arm), and a heat affected zone are all apparent in lap welds (see FIGS. 10–11). Of particular interest is the path of the interlayer's faying surface through the weld nugget.

Figure 12:
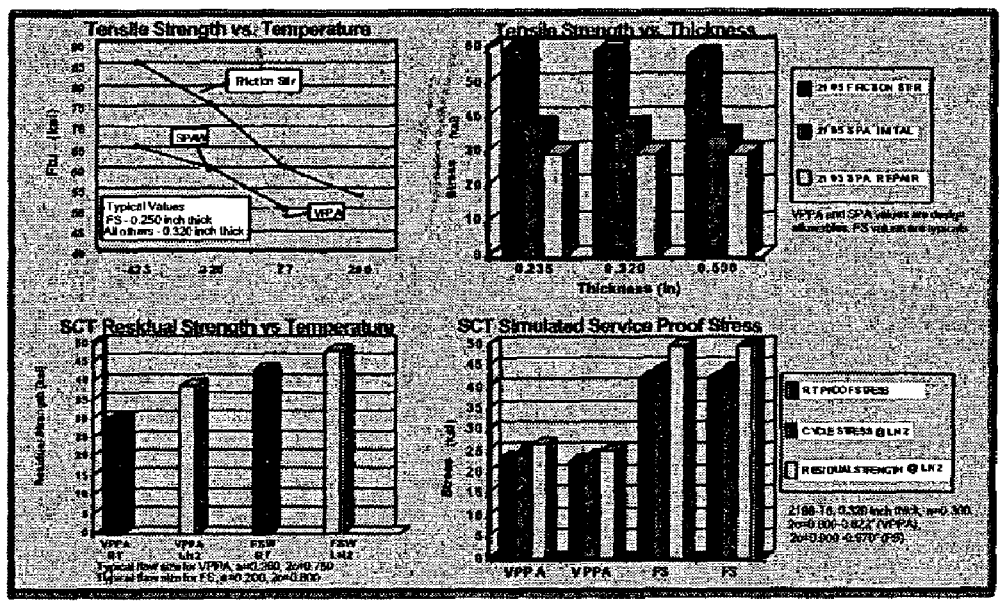
FIG. 12 is a graphical representation of mechanical properties of friction stir welding vs. fusion welds.

Friction Stir Welding offers several mechanical benefits over its fusion counterparts (FIG. 12). Both ultimate tensile strengths and yield strengths are significantly higher over a broad range of temperatures and thicknesses. In addition, friction stir welds show improved fatigue and fracture properties over VPPA/SPA welded plate. Like wrought aluminum products, friction stir welds experience an increase in elasticity and strength with decreasing testing temperature. There is also a marked increase in ductility as compared with fusion welding.

Weld preparation and cleanliness are much less stringent than that required for fusion welding. A simple Scotchbrite® rub of the area to be welded, coupled with an alcohol wipe and deburring of the root side is sufficient to produce quality welds. In addition, friction stir welding is a very robust process with a large operating parameter box.

Figure 13:
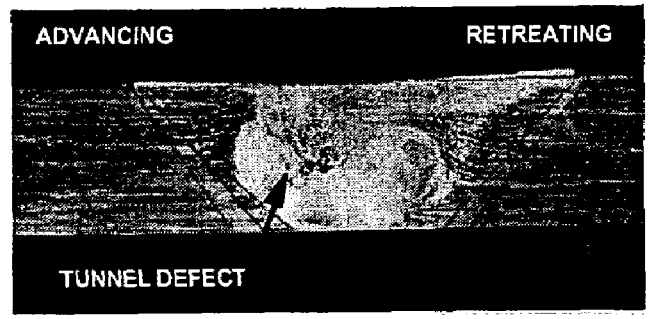
FIG. 13 is an illustration of a friction stir weld with tunnel defect.
Figure 14:
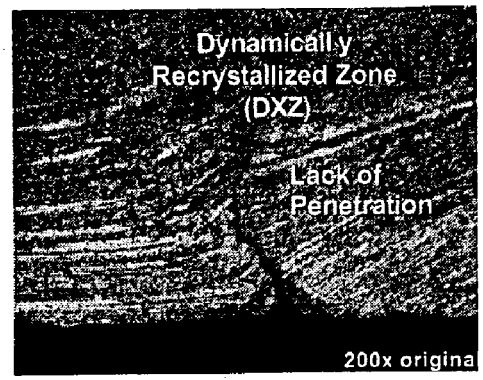
FIG. 14 is an illustration of a friction stir weld with a lack of penetration defect.

There are two types of defects that may occur in butt joints when welds are processed far from normal operating conditions. The first characteristic is a "wormhole" or "tunnel" that runs in the longitudinal direction through the length of the weld (FIG. 13). This defect occurs when there is insufficient forging pressure under the tool shoulder, preventing the material from consolidating. This is normally caused by too quick a welding speed. This defect is readily detectable through radiographic inspection. The second type of defect is a "root lack of penetration" or "root lack of fusion" that occurs when the dynamically recrystallized zone fails to penetrate fully to the bottom surface of the joint (FIG. 14). It can be caused by inadequate tool penetration, insufficient heat and pressure, or improper pin tool geometry. This defect can have an effect on mechanical properties and may be difficult to detect through conventional non-destructive examination techniques. Root lack of penetration is not a concern with partial penetration lap welds.

Figure 15:
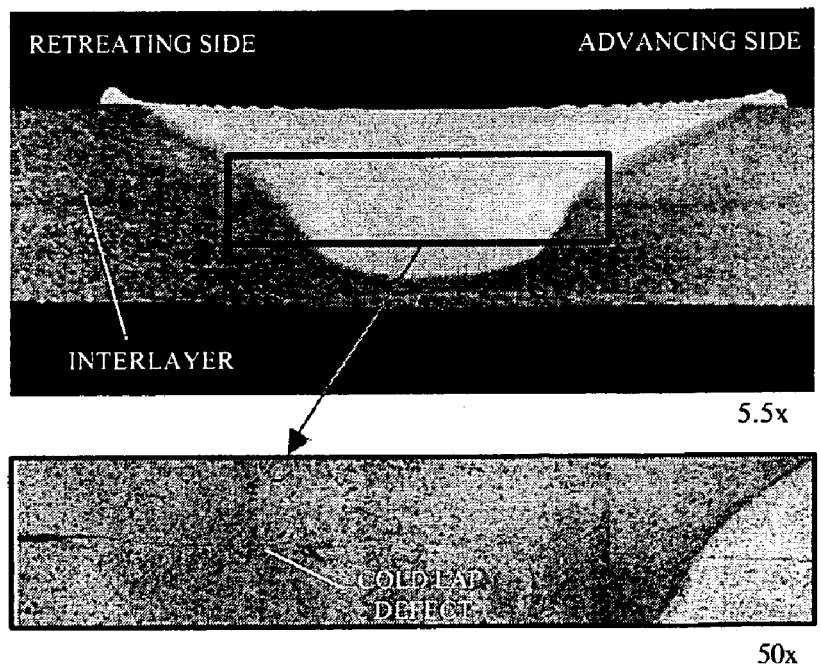
FIG. 15 is an illustration of a friction stir lap weld with cold lap defect in 2024-T83 alloy.

A third type of defect that has been identified specifically for friction stir lap welds can exist when the faying surface between the two sheets becomes stirred into the weld, producing a cold lap defect (FIG. 15). Hot parameters, produced by a relatively fast spindle speed and low travel speed, are required to break up this faying surface and prevent a reduction in the weld's effective thickness. However, one must take caution in not producing too hot a weld, characterized by excessive flash and a powdery surface finish (galling). Alternative pin tool designs are being investigated in an attempt to break up the faying surface within the nugget while operating under colder parameters.

Successful butt and lap friction stir welds have been made at Lockheed Martin Michoud Space Systems (LMMSS) in multiple aluminum alloys including: 2014, 2024, 2219, AFC-458, 2090, 2195, 5083, 6061, 7050, 7075, and 7475. Table 1 shows the average strengths of the welds for some of these alloys. Large grain size extrusion, metal matrix composites (Al—SiC, Al—Al2O3), and dissimilar metal (2219 to 2195) friction stir welds have also been produced that exhibit good strength and quality. Various thicknesses have been joined ranging from 0.063" 2024-T3 sheet to 2" thick 6082-T6 plate welded in a single pass and 3" thick 6082-T6 plate welded in a double pass. Welds up to 43 feet long have been successfully joined with no weld defects and no tool wear.

TABLE 1

Friction stir butt weld joint efficiencies for various aluminum alloys

| Alloy | Parent Metal UTS | Friction Stir Weld UTS | Joint Efficiency |
| --- | --- | --- | --- |
| AFC458-T8 | 79.0 [18] | 52.5 | 66% |
| 2014-T651 | 70.0 [19] | 49.0 | 70% |
| 2024-T351 | 70.0 [18] | 63.0 | 90% |
| 2219-T87 | 69.0 [19] | 45.0 | 65% |
| 2195-T8 | 86.0 [18] | 59.0 | 69% |
| 5083-O | 42.0 [19] | 43.0 | 102% |
| 6061-T6 | 47.0 [18] | 31.5 | 67% |

TABLE 1-continued

Friction stir butt weld joint efficiencies for various aluminum alloys

| Alloy | Parent Metal UTS | Friction Stir Weld UTS | Joint Efficiency |
|---|---|---|---|
| 7050-T7451 | 79.0 [18] | 64.0 | 81% |
| 7075-T7351 | 68.5 [18] | 66.0 | 96% |

Prior shear testing was performed at LMMSS on 2090 lap shear joints mechanically joined with 3/16" diameter 2017 solid "icebox" rivets. Test specimens were manufactured and tested in accordance with MIL-STD-1312-4. Two different sheet thicknesses were tested (t=0.063" and 0.083") at room temperature.

TABLE 2

Lap shear strengths for 2090-T83 sheet joined with a 2017 "icebox" aluminum rivet

| 2090 Sheet | Avg. Strength | St. Dev. |
|---|---|---|
| 0.063" to 0.063" | 1083 | 46.3 |
| 0.080" to 0.080" | 1056 | 8.1 |

Lap shear results on 2090-T83 sheet mechanically joined with 3/16" diameter 2017 aluminum rivets showed little variation between the 0.063" and 0.080" sheet thicknesses (Table 2). Consequently, it can be presumed that the test was appropriately determining the shear strength of only the rivet. Failure occurred by shear through the rivet.

EXAMPLE 1

2090-T83 is an Al—Cu—Li alloy that has been solution heat treated, cold worked and artificially aged. The specified chemical composition and general mechanical properties are given in Tables 3 and 4.

TABLE 3

Chemical composition for 2090-T83 aluminum alloy (wt %) [20]

| Alloy | Cu | Fe | Li | Mg | Mn | Si | Ti | Zn | Zr | Others | Al |
|---|---|---|---|---|---|---|---|---|---|---|---|
| 2090-T83 | 2.4–3.0 | .12 | 1.9–2.6 | .25 | .05 | .10 | .15 | .10 | .08–.15 | .20 | Rem |

TABLE 4

As tested parent metal properties for 2090-T83

| Sheet Thickness (in.) | Grain Direction | UTS (ksi) | YS (ksi) | % EL (2") |
|---|---|---|---|---|
| 0.060 | Longitudinal | 86.5 | 78.9 | 6.0 |
| 0.082 | Longitudinal | 85.8 | 78.0 | 6.0 |

Friction stir lap welds were produced on flat panels of 2090-T83 with the top and bottom sheets having thicknesses of 0.063" and 0.083", respectively. The welds fully penetrated through the top sheet and partially penetrated the bottom sheet. They were done at various spindle and travel speeds in an attempt to achieve the highest weld quality as determined through lap shear strength, metallurgy and non-destructive evaluation. Welds were examined for internal defects using radiography to Grade 1 requirements for manned flight. Of particular interest was the path of the panels' interlayer faying surface.

Lap welded panels were cut for metallographic examination and mechanical shear testing. Shear samples were tested at room temperature on a 20 kip MTS testing machine at a constant cross head deflection of 0.05 in/min. In contrast to the riveted lap shear specimens, the sheet thicknesses of the friction stir welded lap joint varied. Consequently, although the specimens were pin loaded, they were additionally held by offset friction grips to account for the difference in top and bottom sheet thicknesses to ensure loading through the specimen interlayer.

Once desirable friction stir weld parameters had been set, a 21" long, 0.063" thick 2090-T83 stringer 28 having a cross-section shown in FIGS. 5–6, was lap welded to a 0.083" 2090-T83 skin sheet 29. Welds were performed on a conventional mill with a steel backing anvil and traditional finger clamps. A specially designed pin tool 10 (see FIGS. 1–4) was contoured to accommodate the specific geometry of the stringer 28. A duplicate test set was created by mechanically joining the stringer 28 to the skin 29 with 3/16" diameter 2017 solid "icebox" rivets spaced 1" apart.

Two friction stir welded and two riveted compression buckling samples (L/p=11.4) were produced, all identical except for their joining method. Both friction stir welded panels were non-destructively examined using ultrasonic inspection and radiography. These four panels were prepared for compression testing by potting their ends with Hysol Epoxy EA9394. The compression tests were performed at room temperature on a 200 kip MTS testing machine at a constant cross head deflection rate of 0.05 inches per minute.

Larger scale panels having 5 stringers across their width and having dimensions of 60.05"×33.2" are being fabricated. One riveted and one friction stir welded panel will be compression tested at NASA Langley Research Center (LaRC) for comparison.

Lap Shear Results

Friction stir lap welds on 2090-T83 were done at various spindle speeds, travel speeds, and heel plunges. Metallurgical examination of the weld revealed remnant interlayer faying surface across the width of the nugget in all welds. The extent at which the faying surface remained across the weld nugget varied from weld to weld, and is currently being quantified to compare its effect on shear strength results.

Figure 16:
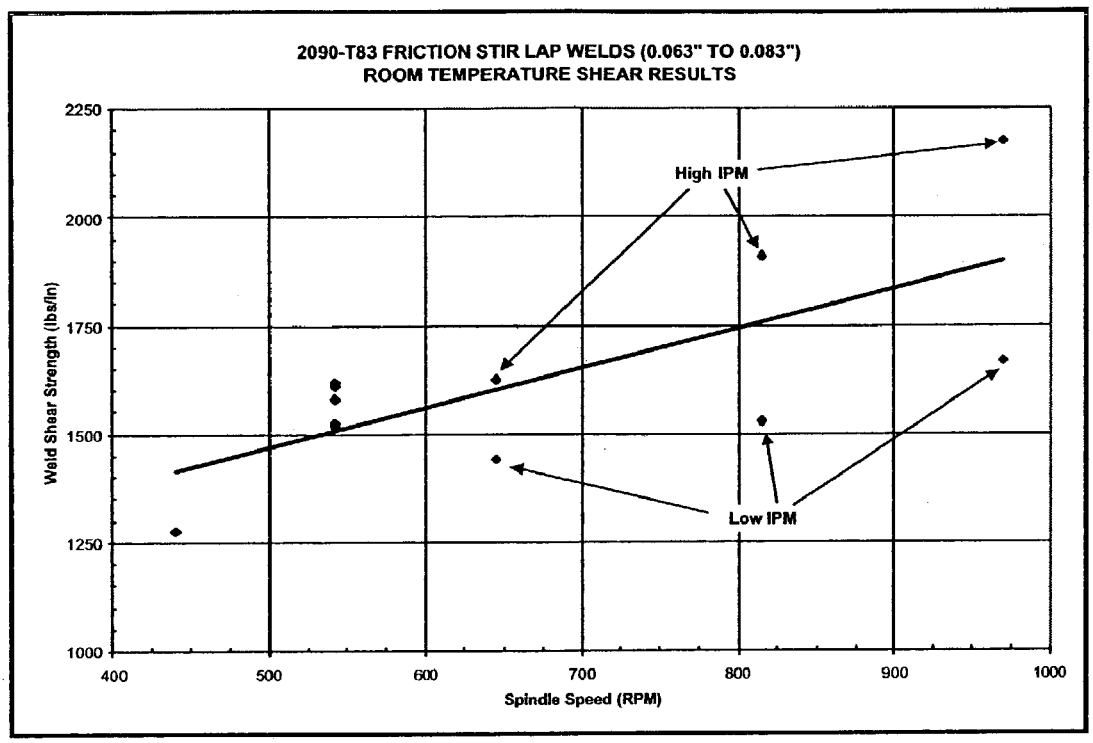
FIG. 16 is a graphical illustration showing shear strength in relation to processing parameters for 2090-T83 alloy friction stir lap welds.

In general, higher strengths were found on welds produced at faster spindle speeds (Table 5). An increase in pin tool rotation enhances the break up of the interlayer surface within the weld nugget. Furthermore, as shown in FIG. 16, for a given rotation speed, the faster travel speed also produced the stronger weld. Lengthening the time at temperature experienced by the panel, resulting from a slower travel speed, increases the heat input into the weld. This additional heat input may cause a softening of the weld zone and consequently, lower shear strengths. Within this experiment, the weld that produced the highest shear strength was that which was processed at the highest spindle speed and the highest travel speed of all those fabricated (970 RPM and 9 inches per minute). Although the friction stir lap welds possessed cold lap defects, they still had shear strengths approximately 50%–100% higher on average than that of the mechanically joined specimens (Table 2). Future work will include testing friction stir welds processed at even higher spindle and travel speeds to produce defect free welds and determine the upper limit of shear strength.

TABLE 5

Processing parameters and strengths for 2090-T83 friction stir lap welds

| Weld No. | RPM | IPM | Weld Pitch (RPM/IPM) | Heel Plunge (in) | Peak Load Avg. (lbs/in) | St. Dev. (lbs/in) | Typical Fracture Location |
|---|---|---|---|---|---|---|---|
| 3 | 440 | 4.5 | 98 | 0.010 | 1277 | 37.1 | Interface Shear |
| 10 | 645 | 5.25 | 123 | 0.007 | 1441 | 7.0 | 0.080" Sheet |
| 6 | 542 | 6.5 | 83 | 0.006 | 1517 | 27.5 | Interface Shear |
| 5 | 542 | 6.5 | 83 | 0.010 | 1524 | 59.5 | Interface Shear |
| 8 | 815 | 7.5 | 109 | 0.007 | 1529 | 41.4 | 0.080" Sheet |
| 4 | 542 | 5.25 | 103 | 0.010 | 1581 | 30.7 | 0.080" Sheet |
| 2 | 542 | 4.5 | 120 | 0.010 | 1610 | 108.3 | 0.080" Sheet |
| 1 | 542 | 3.75 | 145 | 0.010 | 1619 | 20.7 | 0.080" Sheet |
| 7 | 645 | 6.5 | 99 | 0.007 | 1624 | 131.0 | 0.080" Sheet |
| 11 | 970 | 7.5 | 129 | 0.007 | 1668 | 15.2 | 0.080" Sheet |
| 9 | 815 | 9 | 91 | 0.007 | 1909 | 38.2 | 0.080" Sheet |
| 12 | 970 | 9 | 108 | 0.007 | 2175 | 89.2 | 0.080" Sheet |

Figure 17:
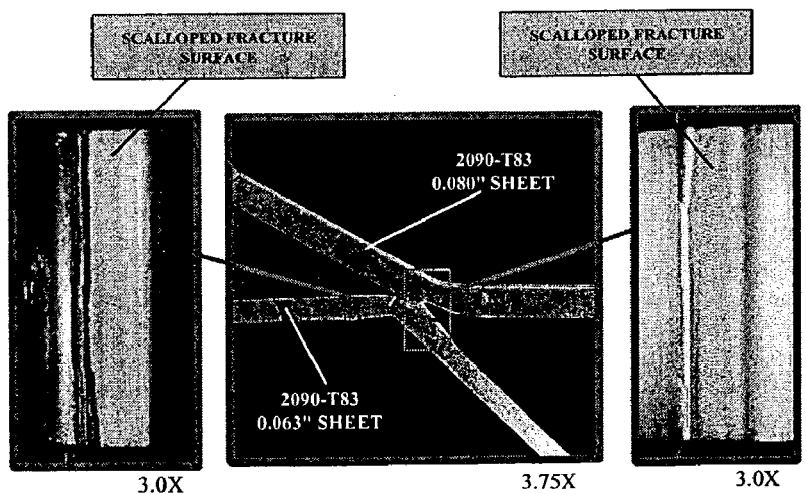
FIG. 17 is a schematic view showing scalloped fracture surface in 2090-T83 alloy friction stir weld.

Two types of fracture surfaces were seen in the shear specimens. In the first type of failure, the friction stir weld shears at the interlayer between the 2090 sheets, with neither of the sheets ultimately failing. The interlayer is strongly present within the weld nugget, and consequently, the weld is of poor quality with only a weak diffusion bond occurring between the two sheets. The fracture surface reveals a scalloped pattern and the resultant shear strengths are low (FIG. 17).

Figure 18:
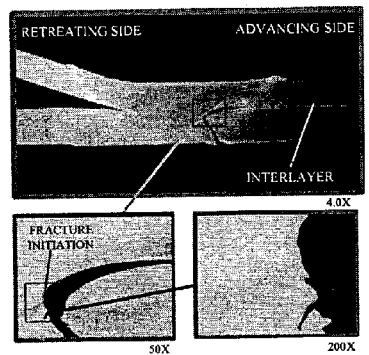
FIG. 18 is a schematic view showing sheared fracture surface in 2090-T83 alloy friction stir weld.

In the second type of failure, fracture initiation occurs within the thicker, bottom sheet where the weld nugget, TMZ, and faying surface all intersect. The fracture traverses along this faying surface and up to the interlayer. The true minimum thickness of the specimen is now the distance from the faying surface to the bottom edge of the 0.083" sheet. Consequently, fracture also moves down from the initiation point and through the thickness of this sheet, where the specimen ultimately fails (FIG. 18).

Compression Buckling Results

Figure 19:
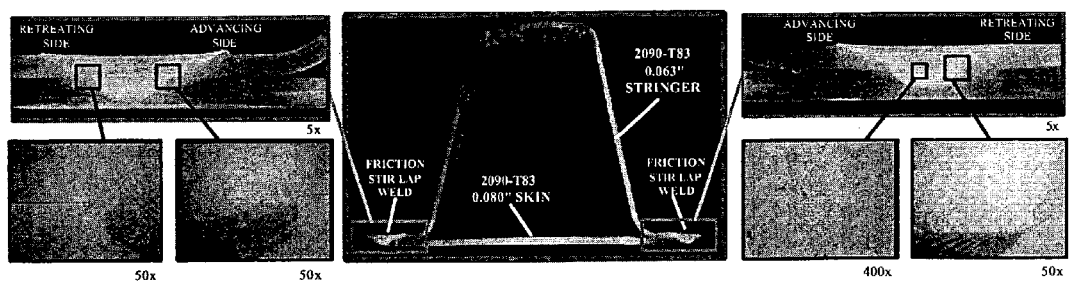
FIG. 19 is a schematic illustration showing the metallurgy of stringer-stiffened friction stir welded 2090-T 83 alloy panels.

Stringer stiffened panels of 2090-T83 were successfully fabricated using friction stir lap welding in place of traditional riveting methods. Visual inspection of the weld showed good bonding, limited flash, and a smooth rippled surface with no galling or excess heat. All welds passed both ultrasonic and radiographic inspection. Metallurgic examination showed that the majority of the interlayer's faying surface was consumed by the fast rotation action of the pin tool at the weld nugget (FIG. 19).

Prior to testing, predicted crippling compression loads for both the riveted and friction stir welded panels were obtained using two different techniques that were based upon specimen geometry (Table 6). It was calculated that ultimate failure for both types of panels would occur at similar loads.

Figure 20:
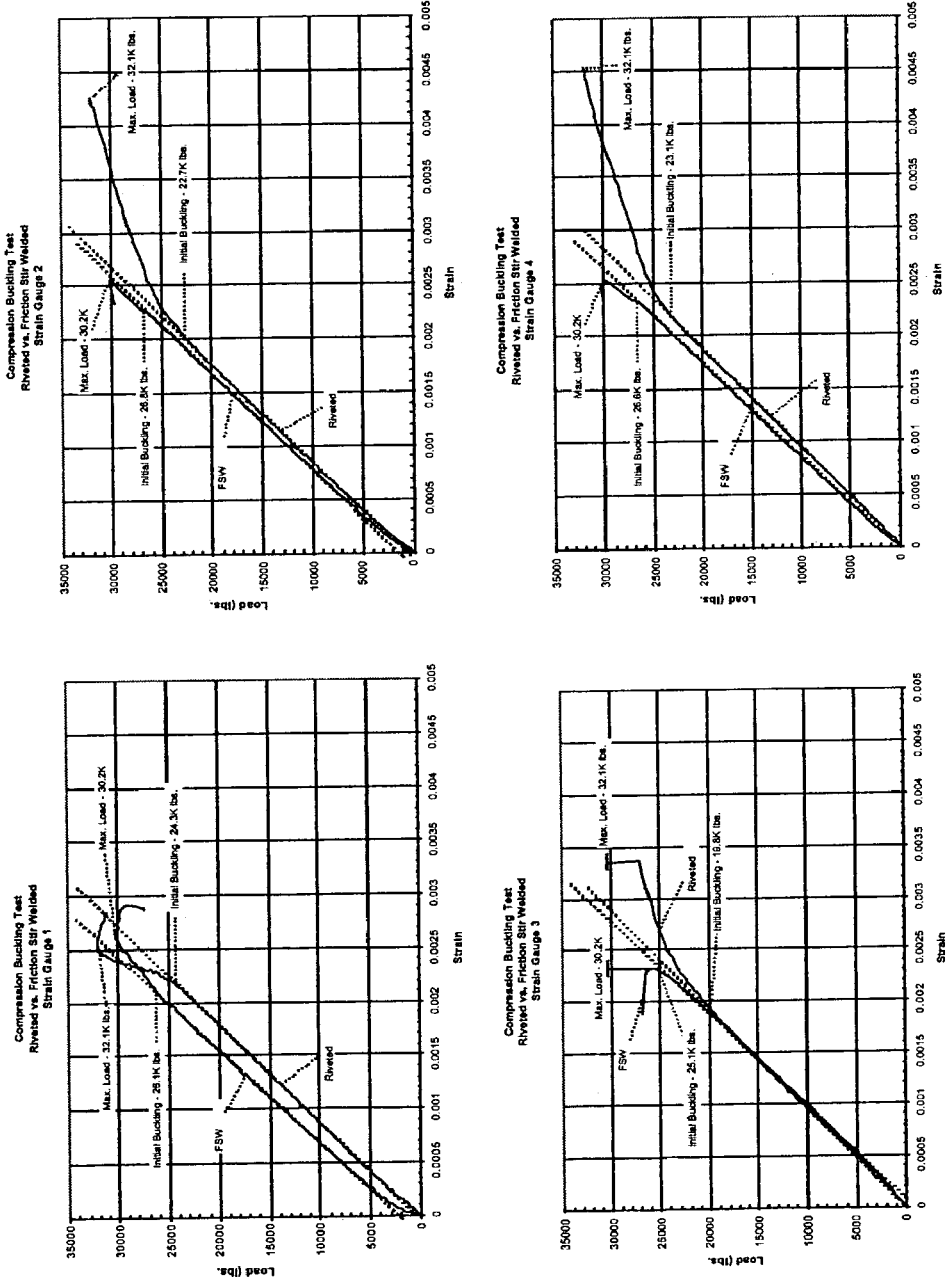
FIG. 20 is a graphical illustration showing compression buckling results for each strain gauge showing initial buckling and ultimate failure load (shown are results obtained from friction stir weld panel and riveted panel)

From the data for each strain gauge, a straight line was drawn along the elastic region of the compression test. Initial buckling was determined to occur at the tangential point of this line with the data, i.e. when inelastic deformation began (FIG. 20).

TABLE 6

Predicted failure loads for compression buckling tests

Ultimate Compression Load (Pc) = 32.3 kips (Johnson-Euler method)
Ultimate Compression Load (Pc) = 32.7 kips (Gerard Crippling
Panel Deflection (d @ Pc) = 0.078 in. method)

Although the riveted specimens ultimately failed at a slightly higher load on average then the friction stir welded panels, initial buckling first occurred in the riveted specimens at approximately 16% (3700 lbs.) lower than the welded panels as determined for each strain gauge. Results are shown in Tables 7 and 8.

TABLE 7

Initial buckling loads for FSW Panel 1 and Riveted Panel 1

| Strain Gauge | FSW (kips) | Riveted (kips) |
|---|---|---|
| 1 | 26.1 | 24.3 |
| 2 | 26.8 | 22.7 |
| 3 | 25.1 | 19.8 |
| 4 | 26.6 | 23.1 |
| Average | 26.2 | 22.5 |

TABLE 8

Failure loads and deflections for FSW and Riveted Panels

| Panel | Ultimate Compression Load (Pc) - kips | Panel Deflection (d @ Pc) - in. |
|---|---|---|
| Friction Stir Weld 1 | 30.2 | 0.092 |
| Friction Stir Weld 2 | 29.5 | 0.084 |
| FSW Avg. | 29.9 | 0.088 |
| Riveted 1 | 32.1 | 0.110 |
| Riveted 2 | 32.7 | 0.095 |
| Riveted Avg. | 32.4 | 0.103 |

Figure 21:
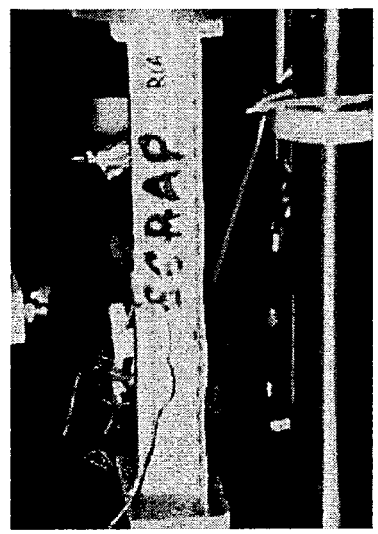
FIG. 21 is a schematic view showing initial buckling on a riveted panel.
Figure 22:
FIG. 22 is a schematic illustration showing compression failure of a riveted panel.
Figure 23:
FIG. 23 is a schematic view showing initial buckling of a friction stir welded panel.
Figure 24:
FIG. 24 is a schematic view showing a compression failure of a friction stir welded panel.

Both riveted panels failed in the same manner. Initial buckling occurred in the skin panel (FIG. 21) and as the buckling continued, the energy was transferred directly into the riveted flanges. As shown in FIG. 22, failure ultimately occurred along the stringer flange, near the row of rivets. Both friction stir welded panels also failed in a similar manner but unlike the riveted panels. Here, the specimen is a more isotropic configuration by virtue of the continuous weld, and consequently the panel acted more as a single "cross-section". As the skin underwent initial buckling (FIG. 23), the load was transmitted to the overall cross-section causing the outer part of the stringer to fail in a combined bending and axial compression mode (FIG. 24).

The welded panel was less stiff at the flange/weld location than the riveted specimen. Since loads seek the stiffest path, more load was transmitted to the riveted flange at a faster rate than the welded specimen. The stringer wall on the riveted panel was not strong enough to distribute the load any further and ultimately failed at the row of rivets in the bend radius of the stringer flange. The welded panel attracted a somewhat lesser load at a slower rate allowing the stringer wall to transfer the stress to the location furthest from the neutral axis. Consequently, once initial buckling of the skin plate and stringer flanges occurred, the overall specimen performed as a column in axial compression and bending, induced by lateral deflection. Results of the large scale panel compression tests are to be reported at a later date.

In Summary 2090-T83 sheet can be successfully joined using friction stir welding in place of traditional mechanical joining processes. High spindle speeds aid in the break up of the interlaying faying surface within the weld nugget. Low travel speeds appear to have a detrimental effect on weld shear strength. Favorable friction stir lap welded shear specimens of 2090-T83 thin sheet had maximum peak loads approximately 100% higher than mechanically joined 2090-T83 using a 3/16" diameter 2017 solid rivet. Calculated predictions of failure load and associated deflections for compression buckling tests were nearly identical to the actual test values obtained. Small scale compression buckling tests performed on friction stir welded stringer-stiffened panels had initial buckling loads approximately 16% higher than identical panels mechanically joined with 2017 solid rivets spaced 1" apart. The failure mechanism for these two types of panels varied.

In FIGS. 25–30, an additional embodiment of the apparatus of the present invention is shown, designated generally by the numeral 50. Friction stir welded joint 50 provides a T-joint design (or tee-shaped structure) that joins three plates 51, 52, 53. The plates 51, 52 and 53 include two plates 51, 52 that are positioned end to end at a plate 53 that forms an angle of about 90 degrees with each of the plates 51 and 52.

Before friction stir welding is to begin, the plates 51, 52, 53 were oriented as shown in FIGS. 25–29 wherein the plate 53 is positioned in between edge portions 54, 55 of the respective plates 51, 52 as shown. Additionally, a projecting part 59 of plate 53 extends above the respective upper surfaces 61, 62 of plates 51, 52. This projecting portion 59 can be seen in FIGS. 26–29. The projecting or protruding portion 59 of the vertically oriented plate 53 in FIGS. 25–29 provides material that can be used for filling the void at contoured corners 81, 82 of respective anvil supports 63, 64.

The vertical plate 53 provides an upper edge 56 that is the upper most part of the plate 53. The vertically oriented plate 53 provides opposed generally parallel planar surfaces 57, 58 that are engaged by anvils 63, 64. The anvil 63 provides a surface 65 that engages surface 57 of plate 53. The anvil 64 provides a surface 66 that engages the surface 58 of plate 53.

Each of the anvils 63, 64 provides a generally flat, planar upper surface. The anvil 63 has an upper surface 67 that is engaged by the lower surface 69 of plate 51. Similarly, the anvil 64 provides a flat, planar upper surface 68 that engages the flat, lower surface 70 of plate 52. Each of the plates 51 and 52 provides a flat, planar upper surface. The plate 51 provides an upper surface 61 that is engaged by the flat, lower surface 73 of clamp 71. Similarly, the plate 52 has an upper surface 62 that is engaged by the flat, planar undersurface 74 of clamp 72.

In the drawings, the numeral 75 refers to the plate centerline for plate 53 that is the vertical plate. In FIGS. 26–29, a pin tool 60 is shown that has a lower end portion 76 with a pin tool tip 79 that engages the upper end portion of plate 53 (including the protruding part 59) and the edges 54, 55 of plates 51, 52 respectively and material of those plates 51, 52 that is next to the edges 54, 55 as seen in FIGS. 25–29. FIG. 26 illustrates the pin tool 60 when centered, aligning its pin tool centerline with the centerline 75 of plate 53. In FIG. 27, the pin tool 60 is shown at a left position at one side of the friction stir weld joint while FIG. 28 shows the pin tool 60 at a position to the right side of the friction stir weld joint. Generally speaking, the friction stir weld tool 60 will travel in between the position shown in FIGS. 27 and 28.

Figure 29:
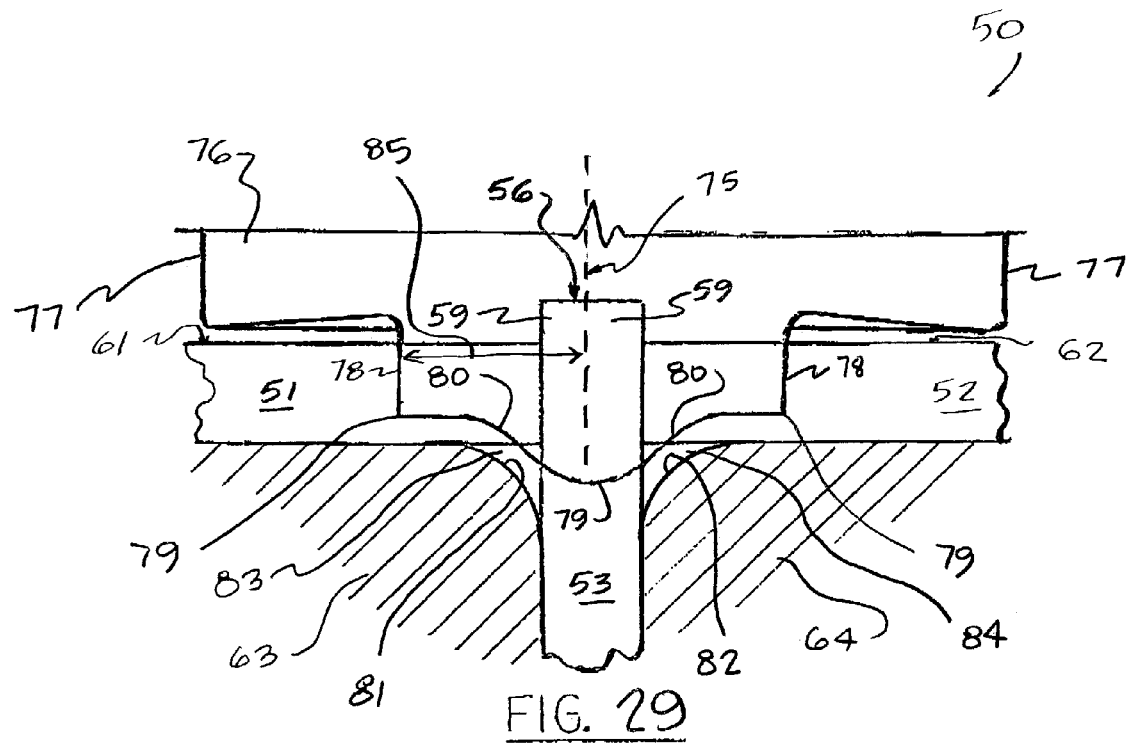
FIG. 29 is a fragmentary enlarged sectional view of the additional embodiment of the apparatus of the present invention.

The position of the clamps 71, 72 relative to the anvils 63, 64 and plates 51, 52, 53 is shown in FIGS. 26–29. FIG. 29 shows an enlarged view of the lower end portion 76 of pin tool 60 and more particularly, the pin tip 79, pin tip contoured sections 80, and cylindrically shaped part 78. The cylindrically shaped part 78 is a smaller diameter cylindrical portion when compared to the larger diameter cylindrically shaped portion 77 that defines the largest diameter of the pin tool 60. Tip 79 communicates with smoothly curved, contoured portions 80 as shown in FIG. 29. The contoured portions 80 communicate with smaller diameter cylindrically shaped part 78 of pin tool 60.

Each of the anvil supports 63 and 64 has a contoured corner. This contoured corner is illustrated as reference numeral 81 for anvil support 63 in FIG. 29. The contoured corner 82 is shown for the anvil support 64 in FIG. 29. The protruding portion of the vertical plate 53 is used for filling the void at contoured corners 81, 82. Those void spaces are indicated by the numerals 83, 84 in FIG. 29.

A larger pin diameter is preferred to ensure that the amount of off centerline is preferably less than about 25 percent of the pin radius 85 (see FIG. 29) The contoured corner 81, 82 of the anvil supports 63, 64 will enable material to conform to the same contour that reduces and/or eliminates stress concentration.

Figure 30:
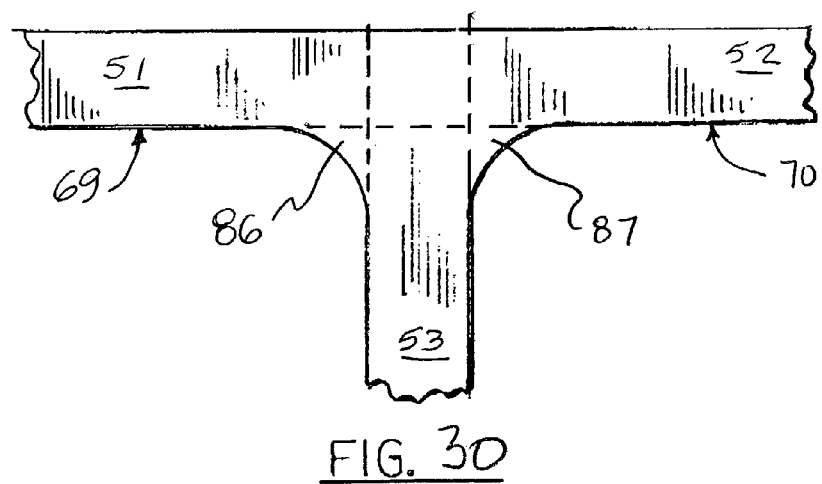
FIG. 30 is an elevation view of a completed, welded tee-shaped panel.

A contour 80 is provided at the pin tip 79 as shown in FIG. 29. This contour 89 at pin tip 79 will have a deeper penetration during friction stir welding in order to completely break the faying surface. In FIG. 30, the completed tee-shaped structure is shown after the welding of FIGS. 25–29. Reference numerals 86–87 designate material that has "filled" the void spaces 83–84 of FIG. 29. That fill material 86–87 is a volume of material that is generally equal to the volume of material that comprised projecting portion 59 (above surfaces 61, 62) in FIG. 29. The fill material 86 is below surface 69 and to the left of plate 53 as shown by dotted lines in FIG. 30. Similarly, fill material 87 is the material below surface 70 and to the right of plate 53 as shown by dotted lines in FIG. 30.

The following is a list of parts and materials suitable for use in the present invention:

PARTS LIST

| Part Number | Description |
| --- | --- |
| 10 | pin tool |
| 11 | end portion |
| 12 | end portion |
| 13 | large cylindrical section |
| 14 | large frustoconical section |
| 15 | groove |
| 16 | tip |
| 17 | cylindrical section |
| 18 | dished end |
| 19 | convex surface |
| 20 | small cylindrical section |
| 21 | small frustoconical section |
| 22 | annular shoulder |
| 23 | angle |
| 24 | central longitudinal axis |
| 25 | annular cavity |
| 26 | external thread |
| 27 | welding machine |
| 28 | stinger panel |
| 29 | stringer panel |
| 30 | inclined portion |
| 31 | flange |
| 32 | arrow |
| 33 | weld |
| 34 | pin tool position |
| 35 | arrow |
| 50 | stir welded joint |
| 51 | plate |
| 52 | plate |
| 53 | plate |
| 54 | edge |
| 55 | edge |
| 56 | edge |
| 57 | surface |
| 58 | surface |
| 59 | protruding part |
| 60 | pin tool |
| 61 | surface |
| 62 | surface |
| 63 | anvil support |
| 64 | anvil support |
| 65 | side surface |
| 66 | side surface |
| 67 | upper surface |
| 68 | upper surface |
| 69 | lower surface |
| 70 | lower surface |
| 71 | clamp |
| 72 | clamp |
| 73 | lower surface |
| 74 | lower surface |
| 75 | plate centerline |
| 76 | lower end pin tool |
| 77 | cylindrically shaped part |
| 78 | cylindrically shaped part |
| 79 | pin tip |
| 80 | contoured section pin tool |
| 81 | contoured corner |
| 82 | contoured corner |
| 83 | void space |
| 84 | void space |
| 85 | pin radius |

PARTS LIST -continued

| Part Number | Description |
| --- | --- |
| 86 | fill material |
| 87 | fill material |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A method of joining aluminum alloy panels, comprising the steps of:
   a) preliminary positioning a center panel and a pair of side panels in contact and relative to one another so that the side panels abut the center panel on respective opposing sides of the center panel with a smaller portion of the center panel extending above the side panels and a larger portion of the center panel extending below the side panels, said projection portion and part of each of the side panels defining a faying surface;
   b) providing a friction stir weld pin tool;
   c) connecting the center and side panels together with a friction stir weld by fully penetrating the pin tool through the projecting portion and part of each of the side panels; and
   d) wherein in step "c" the panel material around the pin tool is frictionally heated, plasticized, and joined until the faying surface is substantially consumed and at part of the projecting portion provides a volume of material that forms a reinforced corner at the interface of each side panel with the center panel.

2. The method of claim 1 further comprising the step of allowing the panel material to cool and consolidate under pressure.

3. The method of claim 1 further comprising the step of constructing an air frame of a plurality of panels, wherein at least a plurality of the panels are connected together by using steps "a" through "d".

4. The method of claim 1 wherein the faying surface includes an area on the surface of one plate and an area on each of the side plates and some of the center plate that extends above the side plates, and wherein substantially all of said faying surface areas are consumed by the weld in steps "c" and "d".

5. The method of claim 1 wherein in step "a" the side panels occupies a common plane.

6. The method of claim 1 wherein the faying surface includes a portion of each side panel that contacts the center panel and in steps "c" and "d" a portion of each of the side panels is completely stirred during friction stir welding.

* * * * *